United States Patent [19]

Utaka et al.

[11] Patent Number: 4,923,265
[45] Date of Patent: May 8, 1990

[54] LIGHT TRIGGERING SWITCH

[75] Inventors: Katsuyuki Utaka, Musashino; Masanobu Fujioka, Ohmiya, both of Japan

[73] Assignee: Kokusai Denshin Denwa Kabushiki Kaisha, Tokyo, Japan

[21] Appl. No.: 259,167

[22] Filed: Oct. 18, 1988

[30] Foreign Application Priority Data

Oct. 22, 1987 [JP] Japan .................................. 62-265385

[51] Int. Cl.$^5$ .............................................. G02B 6/10
[52] U.S. Cl. .............................. 350/96.14; 350/96.13; 350/96.15
[58] Field of Search ............... 350/96.13, 96.14, 96.15, 350/96.16, 354, 355; 455/600, 612

[56] References Cited

U.S. PATENT DOCUMENTS

| 4,190,811 | 2/1980 | Alcock et al. | 350/354 |
| 4,204,116 | 5/1980 | Cresswell et al. | 350/355 |
| 4,382,660 | 5/1983 | Pratt, Jr. et al. | 350/354 |
| 4,626,075 | 12/1986 | Chemla | 350/96.14 |
| 4,716,449 | 12/1987 | Miller | 350/354 |
| 4,722,081 | 1/1988 | Fujito et al. | 350/96.15 |
| 4,783,851 | 11/1988 | Inou et al. | 350/96.14 |
| 4,805,975 | 2/1989 | Utaka et al. | 350/96.13 |
| 4,815,803 | 3/1989 | Faulkner et al. | 350/96.14 |

OTHER PUBLICATIONS

Morimoto et al.; "A Picosecond Optical Gate Using Photo-Induced Grating"; Japanese Journal of Applied Physics, vol. 20, No. 6; Jun., 1981; pp. 1129–1133.

Primary Examiner—William L. Sikes
Assistant Examiner—John Ngo
Attorney, Agent, or Firm—Emmanuel J. Lobato; Robert E. Burns

[57] ABSTRACT

A light triggering switch is disclosed for switching the optical path of an input optical signal to a desired output optical path. A portion of an optical control signal of a predetermined wavelength is branched by a branching filter. An electrically-controlled optical switch is provided for converting the branched optical control signal into an electrical signal and for switching the optical signal to the desired output optical path in accordance with the intensity of the converted electrical signal. In place of the electrically-controlled optical switch, a nonlinear reflector type optical switch may be provided for switching the optical signal to the desired output optical path in accordance with the intensity of the branched optical control signal.

4 Claims, 7 Drawing Sheets

LIGHT TRIGGERING SWITCH

BACKGROUND OF THE INVENTION

The present invention relates to an optical switch for switching optical paths of optical signals and, more particularly, to a light triggering type switch which utilizes light of a predetermined wavelength as control energy for triggering its switching operation.

With the development of fiber optic communications attention is now being paid to the optical switching technology for switching optical signals to a desired channel. It is considered, in particular, that as an optical line becomes increasingly common in the subscriber's system, optical switches will be needed in vast numbers, and their miniaturization and sophistication are desired. There is also a demand for the development of an integrated optical switching element for adaptation to submarine switching in a submarine fiber optical transmission system or satellite-loaded switch which is limited in the space therefor and required to be highly reliable.

To meet with such requirements, study is being given on an optical switch of the type in which an optical signal is once converted into an electric signal (an optoelectro conversion) and the electric signal is switched by an electronic circuit as in the past, thereafter being re-converted into an optical signal (an electro-opto conversion). As a result of the recent progress of the OEIC (Opto-Electronic Integrated Circuit) technology, a four-by-four optical switch, though in a hybrid structure, has been reported. This O/E/O type optical switch, which involves the conversion of an optical signal to electric form and then back to optical form, is readily acceptable as a miniaturized version of a conventional optical switching device formed by discrete elements. It is considered, however, that this optical switch has a defect of an increase in crosstalk by electromagnetic interference in the electronic circuit during its high-speed operation. In addition, it is difficult, at present, to obtain an ultra high-speed electronic circuit capable of performing satisfactory operations at high frequencies above several gigahertz.

Another optical switch suggested so far is one that switches an optical signal without converting it into an electric signal, and this switch is termed an O/O type.

These optical switches do not involve the O/E and E/O conversions for wide-band optical information signals, and hence has advantages that they are simple-structured and capable of switching optical signals without impairing their wide band property. These conventional optical switches are designed taking only the switching section into account and no consideration is paid to the operation for a multichannel input, that is, the operation for storing an input in a closed channel and for handling other multiplexed signals.

SUMMARY OF THE INVENTION

It is therefore an object of the present invention to provide a light triggering type switch which is capable of taking out an optical control signal of a predetermined wavelength and permits switching a wide-band optical information signal of a wavelength different from that of the optical control signal, without the necessity of its O/E conversion.

The feature of the present invention resides in that an optical switch, which switches the optical path of an input optical signal to a desired output optical path to derive therefrom the optical signal, comprises a branching filter for branching a portion of an optical control signal of a predetermined wavelength, and an electrically-controlled optical switch which converts only the branched optical control signal into an electric signal and switches the optical signal to the desired output optical path in accordance with the intensity of the electric signal, or a nonlinear reflector type optical switch which switches the optical signal to the desired output optical path in accordance with the intensity of the branched optical control signal.

BRIEF DESCRIPTION OF THE DRAWINGS

The present invention will be described in detail below in comparison with the accompanying drawings, in which.

DETAILED DESCRIPTION

To make differences between prior art and the present invention clear, examples of prior art will first be described.

Figure 1:
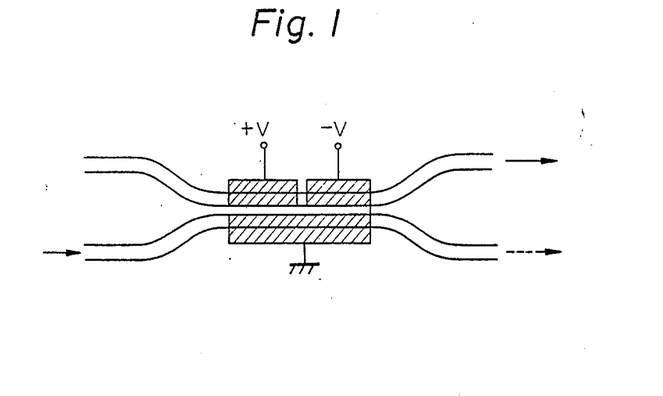
FIGS. 1 and 2 are schematic diagrams showing conventional optical switches of the type employing an electrical signal as a control signal.
Figure 2:
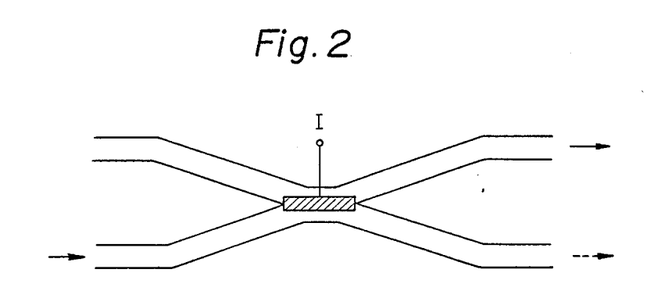

FIGS. 1 and 2 show, in elevation, conventional optical switches. The optical switch depicted in FIG. 1 employs directional couplers. By applying a voltage as a control signal to a switching section the refractive indices of waveguides are varied so that the phase matching condition between two waveguides is satisfied or dissatisfied for switching light between them. The optical switch in FIG. 2 employs current as a control signal. By injecting a current I into the intersecting portion of two waveguides centrally thereof their refractive indices are varied with the resulting carrier density, whereby light is totally reflected and switched from one waveguide to the other. These conventional optical switches, however, are designed taking only the switching section into account and no consideration is paid to the operation for a multichannel input, that is, the operation for storing an input in a closed channel and for handling other multiplexed signals, as described above.

With reference to the accompanying drawings the present invention will hereinafter be described in detail. Incidentally, the following will describe in detail, by way of example, a light triggering type switch for packet switching use which sequentially actuates optical switches by use of a wavelength-multiplexed optical signal.

The light triggering type switch of the present invention comprises, as described later, an optical switch section which is controlled in accordance with the presence or absence of a wavelength which has routing information, and an optical memory section which is equipped with a function of controlling the storage and resending of a lower-priority one of two input packets. The device constructions of respective sections differ from each other depending on the durations of routing information, packet pressure information and packet end information pulses. Then a description will be given of four kinds of wavelength-multiplexed optical signals classified as shown in FIGS. 3A to 3D. In FIGS. 3A to 3D, $\lambda_s$ is a wavelength indicating the presence of a packet, $\lambda_e$ a wavelength indicating the end of the packet, $\lambda_D$ the wavelength of a data signal, and $\lambda_1$, and $\lambda_2$ and $\lambda_3$ wavelengths indicating routing information. While this example is shown to employ three-wavelengths, i.e. three-stage switch structure, it is possible to increase the number of stages by increasing the number of essentially different wavelengths.

A description will be given first of the arrangement of the optical switch section of the present invention which performs a switching operation depending on the presence or absence of an optical control signal of a predetermined wavelength (hereinafter referred to as a "routing signal").

(1) OPTICAL SWITCH SECTION

Embodiment 1

Figure 4:
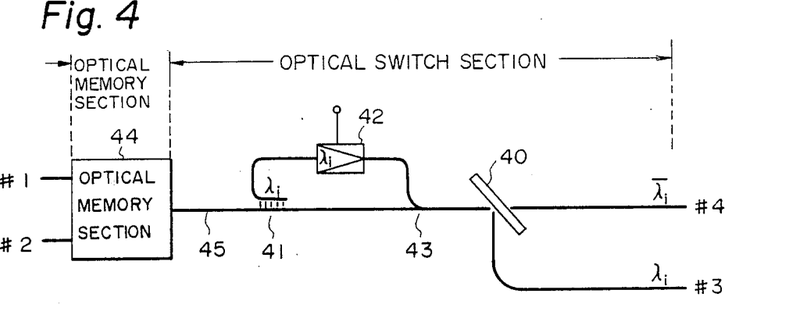
FIGS. 4, 5, 6, 7, 8 and 9 illustrate embodiments of an optical switch section which forms the light triggering switch of the present invention.

FIG. 4 is a schematic diagram of the optical switch section of the light triggering type switch according to a first embodiment of the present invention.

Figures 3A, 3B:
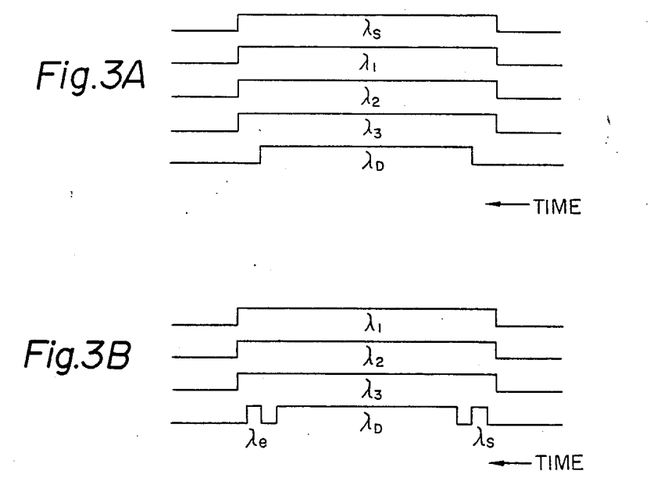
FIGS. 3A to 3D show four kinds of packet structures for use in the optical packet switching system according to the present invention.

FIG. 4 shows an example in which the packet has a structure in which a routing information pulse of the wavelength $\lambda_i$ (where i=1, 2, 3) covers the entire length of the packet, as described in FIGS. 3A and 3B. The optical switch section of this embodiment comprises a nonlinear reflector 40, a branching filter 41, an optical amplifier 42 and an optical coupler 43. Reference numeral 44 indicates an optical memory section described later, which has incorporated therein a feature of preferentially providing on a signal line 45 an earlier one of input signals from channels #1 and #2 while at the same time storing the other input signal temporarily. Paths of optical signals are indicated by thick lines. The nonlinear reflector 40 totally reflects signal light when its intensity is markedly high but permits the passage therethrough of the signal light when its intensity is low. This reflector can be obtained using a semiconductor crystal of a large nonlinearity constant, semiconductor-doped glass, or an oxide such as ZnO.

Although this embodiment is shown to utilize reflection at the surface of the material forming the reflector, it is also possible to employ a waveguide type optical switch proposed in Japan. Pat. Appln. No. 9942/87 filed by the applicant of this application.

This embodiment operates in the following manner: Where a packet input from the channel #1 or #2 contains a routing pulse of the wavelength $\lambda_i$ (where i=1, 2, or 3), the pulse is branched by the branching filter 41 for the wavelength $\lambda_i$ and amplified by the optical amplifier 42 for the wavelength $\lambda_i$. The amplified output is provided again on the initial signal line 45 by the optical coupler 43 and applied to the nonlinear reflector 40. In this instance, since the pulse of the wavelength $\lambda_i$ has been amplified to a sufficiently high light intensity, the nonlinear reflector 40 becomes totally reflecting; so that subsequent signals in the packet are all provided to a channel #3. Since the pulse of the wavelength $\lambda_i$ ($\lambda_i$ pulse) ends at the same time as the packet is entirely reflected to the channel #3, the nonlinear reflector 40 automatically returns to its initial non-reflecting state. On the other hand, when the packet does not contain the $\lambda_i$ pulse, the nonlinear reflector 40 remains unchanged and permits the passage therethrough of all signals of the packet to a channel #4. In this way, the switching operation is selectively carried out depending on whether the $\lambda_i$ pulse is contained in the packet.

Embodiment 2

Figure 3C:
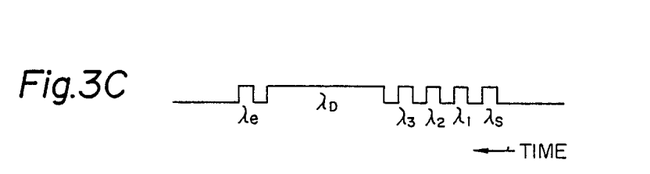
Figure 5:
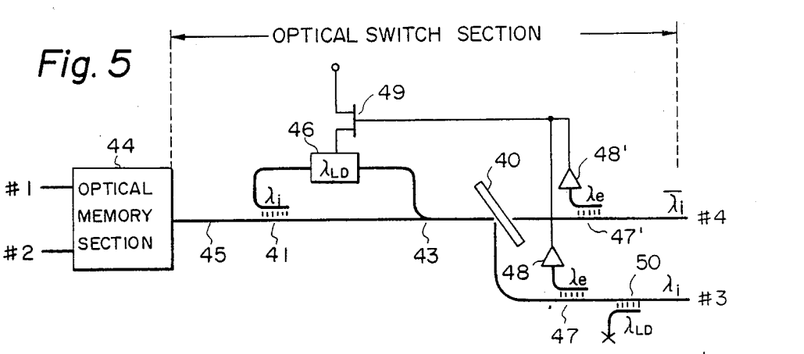

FIG. 5 illustrates a second embodiment of the optical switch section according to the present invention, which is applied to the packet structure depicted in FIG. 3C. The packet shown in FIG. 3C includes a packet presence pulse of the wavelength $\lambda_s$ in the header portion and each routing pulse of the wavelength $\lambda_i$ (where i=1, 2, 3) followed by a data signal of the wavelength $\lambda_D$ and the packet end pulse. In this case, since the duration of the routing pulse is short, a semiconductor laser 46 which responds to light of the wavelength $\lambda_i$ to oscillate and emit continuous high-intensity light of a wavelength $\lambda_{LD}$ is employed in place of the optical amplifier 42 for the $\lambda_i$ pulse shown in FIG. 4.

As is the case with the first Embodiment, the output light of the semiconductor laser 46 is provided on the signal line 45 by the optical coupler 43, putting the nonlinear reflector 40 into its totally reflecting state. When the packet is provided at channels #3 or #4 depending on whether it contains the routing pulse $\lambda_i$, the packet end pulse of the wavelength $\lambda_e$ is branched by a branching filter 47 or 47' therefor and subjected to a photoelectric conversion by a photodetector 48 or 48', and the converted output is applied to a normally-ON type FET switch 49 on a power supply line to the semiconductor laser 46, turning OFF the switch 49. By this, the power supply to the semiconductor laser 46 is temporarily stopped and at the same time its oscillation is also stopped, allowing the nonlinear reflector 40 to be restored to its initial state. The output light of semiconductor laser 46 is provided also to the channel #3, but this is unnecessary at subsequent stages, and hence is removed by a branching filter 50 for the wavelength $\lambda_{LD}$. Incidentally, thin lines are paths of electric signals, and this applies to the following description.

Embodiment 3

Figure 3D:
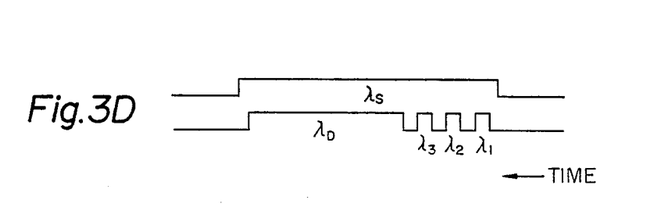
Figure 6:
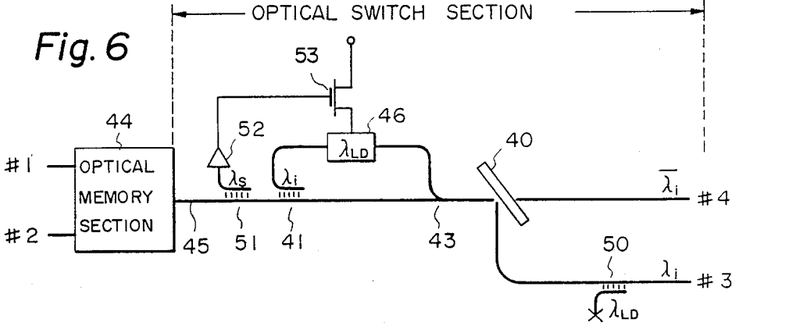

FIG. 6 illustrates a third embodiment of the optical switch section according to the present invention, which is applied to the packet structure shown in FIG. 3D in which routing pulses are included in the packet head portion but the packet presence pulse ($\lambda_s$) is long enough to cover the entire length of the packet. This embodiment is identical with the second Embodiment in the mechanism of actuating the nonlinear reflector 40 but differs therefrom in that the packet presence pulse $\lambda_s$ is branched by a branching filter 51 and subjected to a photoelectric conversion by a photodetector 52, turning ON a normally-OFF type FET switch 53 on the power supply line to the semiconductor laser 46. Accordingly. when the routing pulse $\lambda_i$ signal is included in the routing pulses, the semiconductor laser 46 is caused by the injection thereinto of light to oscillate, by which the non-linear reflector 40 is altered to the totally reflecting state, outputting therethrough the packet to the channel 190 3. When the pulse $\lambda_i$ is not present, the packet will pass through the nonlinear reflector 40 to the channel #4.

Figure 7:
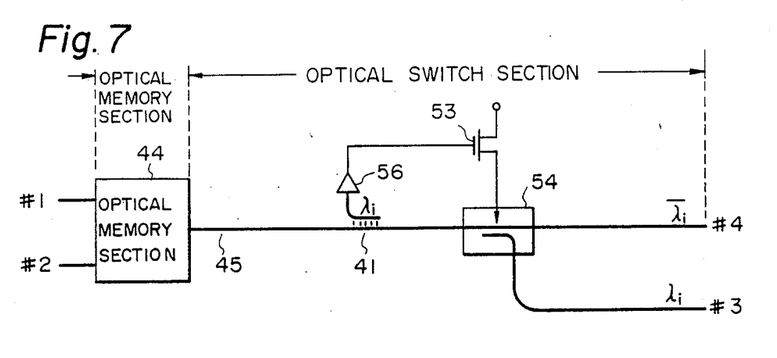
Figure 8:
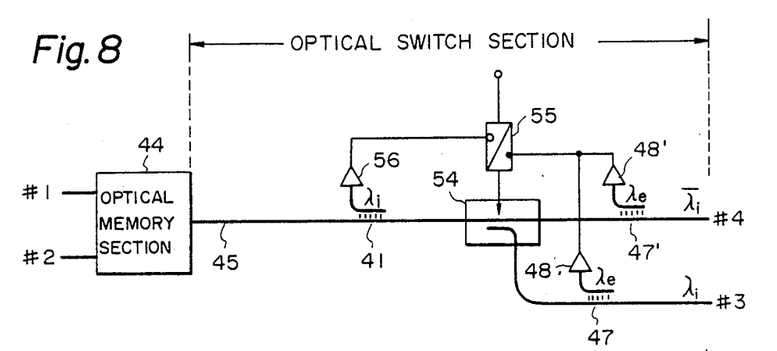
Figure 9:
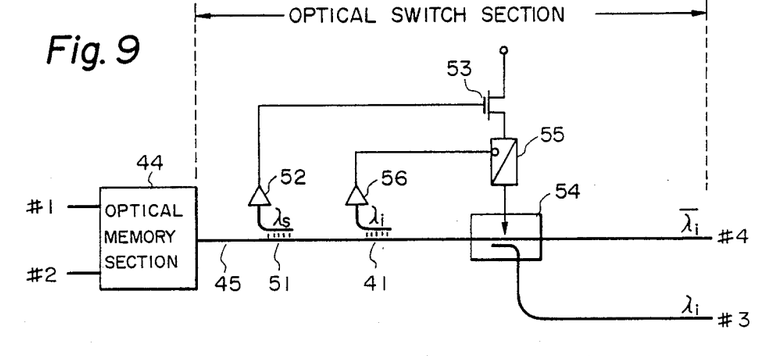

While the above first and second Embodiments have been described to use the nonlinear reflector 40 as the optical switching element, the present invention is not limited specifically thereto but can also be implemented using an electrically-controlled type optical switching element. FIGS. 7, 8 and 9 illustrate other examples employing the electrically-controlled type optical switching element, corresponding to the first Embodiment (FIG. 4), the second Embodiment (FIG. 5) and the third Embodiment (FIG. 6), respectively. Reference numeral 54 indicates the electrically-controlled type optical switch, and the degree of coupling between directional coupling waveguides or total reflection at the crossing portion of crossing waveguides, formed on a ferroelectric substrate as of $LiNbO_3$ or semiconductor substrate, is controlled by an electric signal. That is to say, the routing pulse ($\lambda_i$) is branched and converted to an electric signal, which is used to turn ON and OFF the power supply to the optical switch, thereby switching the packet between the channels #3 and #4. Reference numeral 55 identifies a flip-flop, which is turned ON by a signal applied to its white-circled terminal and OFF by a signal to its black-circled terminal.

The operation timing of the optical switching element and the timing of optical signals of the packet are obtained mainly by optimizing the length of the optical signal line 45 formed of an optical fiber. Further, each control signal can be obtained simply by branching a portion of light of each of the wavelengths $\lambda_s$, $\lambda_i$ and $\lambda_e$, and accordingly, all information is maintained unchanged and propagated to the subsequent stages. An optical amplifier may also be provided additionally, if required.

Next, the optical memory section according to the present invention will be described.

(2) OPTICAL MEMORY SECTION

Embodiment 4

Figure 10:
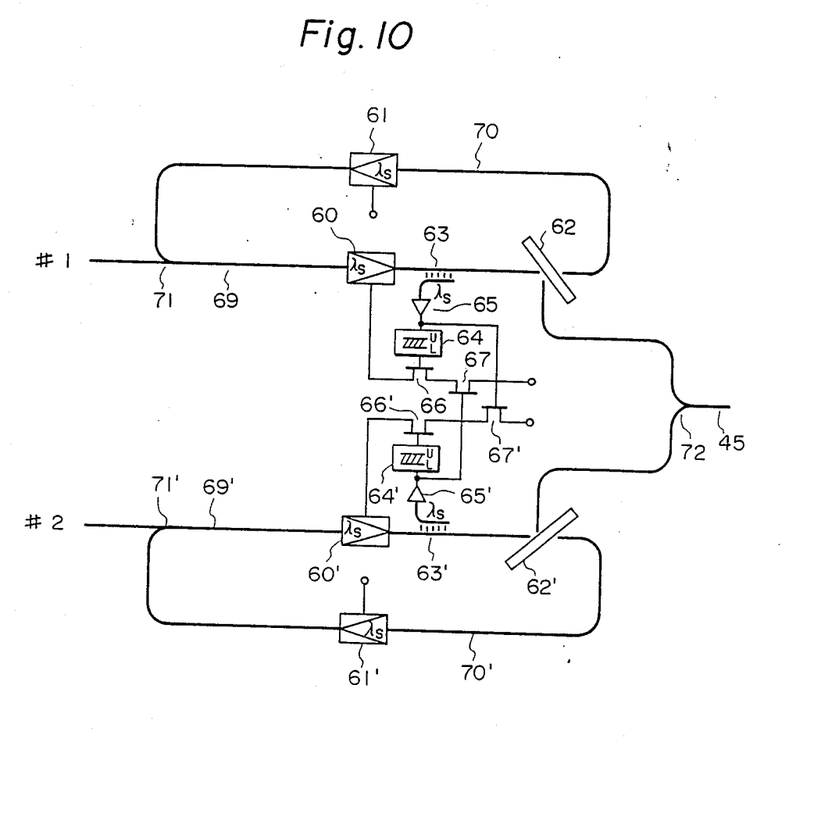
FIGS. 10 and 11 are schematic diagrams of an optical memory section according to the present invention.

FIG. 10 illustrates an embodiment of the optical memory section according to the present invention. This embodiment is applied to the packet structures shown in FIGS. 3A and 3D in which the packet presence pulse of the wavelength $\lambda_s$ covers the entire length for the packet, and the passage of a higher-priority packet and the storing and resending of a lower-priority packet are controlled in accordance with the presence or absence of the wavelength $\lambda_s$. Reference numerals 60, 60', 61 and 61' designate $\lambda_s$ pulse optical amplifiers, 62 and 62' nonlinear reflectors, 63 and 63' $\lambda_s$ pulse branching filters, 65 and 65' photodetectors, 64 and 64' discrimination circuits each of which outputs an electric signal only when the input electric signal thereto has a level intermediate between predetermined upper (U) and lower (L) levels, 66, 66', 67 and 67' normally-ON type FET switches, 69 and 69' main optical signal lines, 70 and 70' optical loop lines, 71, 71' and 72 optical couplers, and 45 an optical memory output line connected to the afore-mentioned optical switching section. Thick lines are optical signal lines formed mainly of optical fibers and thin lines are electric signal lines.

Next, a description will be given of the principle of operation of the optical memory section in this embodiment.

Now, let it be assumed that a packet #1 is input from the channel #1. The packet presence pulse (of the wavelength $\lambda_s$) is amplified by the optical amplifier 60 and applied to the nonlinear reflector 62, putting it onto the totally reflecting state. Since the $\lambda_s$ pulse extends over the entire length of the packet, the packet is reflected and provided via the optical coupler 72 onto the optical memory output line 45. While the packet #1 is passing through this optical switch section, a portion of the $\lambda_s$ pulse is taken out, as an electric signal, by the $\lambda_s$ pulse branching filter 63 and the photodetector 65, and the electric signal is applied to the normally-ON type FET switch 67' to turn it OFF; so that the amplification degree of the optical amplifier 60' for the $\lambda_s$ pulse on the channel #2 is zero or minus. Consequently, even if a packet #2 is input from the channel #2 at this time, its packet presence pulse (of the wavelength $\lambda_s$) is attenuated and the nonlinear reflector 62' permits the passage therethrough of the packet accordingly. As a result of this, the packet #2 enters the optical loop line 70' and goes around the optical loop formed by the main optical signal line 69' and the optical loop line 70' and hence is stored until after the packet #1 passes through the optical memory section. In this instance, the packet presence pulse $\lambda_s$ is amplified by the optical amplifier 61' so as to compensate for its intensity attenuated by the optical amplifier 60' in the OFF state. After the packet #1 has been passed through the optical memory section and provided on its output line 45, the normally-ON type FET switch 67' is turned ON, the packet presence pulse of the packet #2 is amplified, and the non-linear reflector 62' is put to the totally reflecting state, whereby the packet #2 is provided on the optical memory output line 45. In this case, to prevent that the optical amplifier 60' is turned ON during the passage therethrough of the packet #2 and interrupts it, a portion of the output of the photodetector 63' is discriminated in level and the optical amplifier 60' is turned ON only before or after the passage therethrough of the packet. Accordingly, when the channel #2 is in the ON state, the functions of the channel #1 and the channel #2 are reversed.

While this embodiment employs the nonlinear reflectors 62 and 62', it is also possible to use the afore-mentioned electrically-controlled type optical switch by detecting the $\lambda_s$ pulse in the same manner as in FIG. 7.

Embodiment 5

Figure 11:
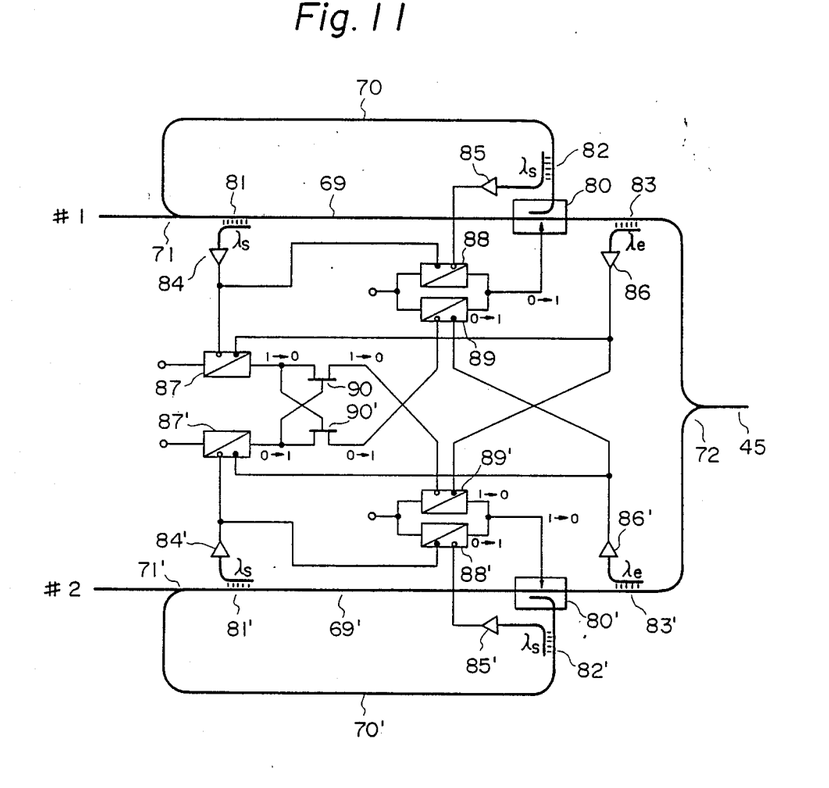

FIG. 11 illustrates another embodiment of the optical memory section according to the present invention, which is applied to the packet structure having the packet presence pulse (of the wavelength $\lambda_s$) at the head thereof and the packet end pulse (of the wavelength $\lambda_e$) at the end thereof, as depicted in FIG. 3B or 3C.

Reference numerals 80 and 80' identify electrically-controlled type optical switches, 81, 81', 82 and 82' $\lambda_s$ pulse branching filters, 83 and 83' $\lambda_e$ pulse branching filters, 84, 84', 85, 85', 86 and 86' photodetectors, 87, 87', 88, 88', 89 and 89' flip-flops (each of which is turned ON by a signal applied to the white-circled terminal and OFF by a signal applied to the black-circled terminal), and 90 and 90' normally-ON type FET switches.

The principle of operation of this embodiment is as follows: When a packet #1 is input from the channel #1, the packet presence pulse (of the wavelength $\lambda_s$) turns OFF the flip-flop 88 via the branching filter 81 and the photodetector 84. Further, since the flip-flop 89 is normally OFF, no electrical control signal is applied to the optical switch 80. Accordingly, the packet #1 passes through the optical switch 80 and is provided on the optical memory output line 45 via the optical coupler 72. During the transmission of the packet #1 over the main optical signal line 69 the $\lambda_s$ pulse of the packet #1 is provided via the branching filter 81 to the photodetector 84, by which it is converted into an electric signal, which is then applied to the flip-flop 87 to turn it ON, and further the electric signal is provided via the normally-ON type FET switch 90 to the flip-flop 89' to turn it ON, thus switching the optical switch 80' on the channel #2 to the ON state in which it inhibits the passage therethrough of the input optical signal. Accordingly, even if a packet #2 is input from the channel #2 after the packet #1 from the channel #1, the former is bypassed to the optical loop line 70' and circulates around the optical loop composed of the main optical signal line 69' and the optical loop 70' on the channel #2; namely, the packet #2 is stored. Upon detecting the packet end pulse (of the wavelength $\lambda_e$) of the packet #1 by the branching filter 83, the flip-flop 89' is turned OFF. When the $\lambda_s$ pulse of the packet #2 circulating around the loop is detected via the branching filter 81', the flip-flop 88' is turned OFF, and accordingly the packet #2 is allowed to pass through the optical switch 80' to the optical memory output line 45. In order to prevent that the packet #2 is cut off by the switching of the optical switch 80' from the ON to the OFF state during the passage therethrough of the packet, the $\lambda_s$ pulse branching filter 82' is provided directly in association with the optical switch 80', by which the optical switch 80' is kept in the ON state while the packet #2 passes therethrough in that state. When the application of the packet #2, stored in the optical loop, to the optical memory output line 45 is started, the functions of the #1 channel and the #2 channel are exchanged.

The ON-OFF operation of each element in the optical memory section and the timing of the packet optical signals are obtained by optimizing the lengths of the main optical signal lines 69 and 69' and the optical loop lines 70 and 70' each of which is formed by an optical fiber.

TABLE 1

| Optical Memory Section | Optical Switch Section | | |
|---|---|---|---|
| | FIGS. 4 & 7 | FIGS. 5 & 8 | FIGS. 6 & 9 |
| FIG. 10 | 3A | — | 3D |
| FIG. 11 | 3B | 3C | — |

Table 1 shows combination of the above-described optical switch and optical memory sections which are applicable to the packet structures depicted in FIGS. 3A to 3D. In the systems of any combinations a portion of each of the packet presence signal, the routing signal and the packet end signal is subjected to the photoelectric conversion, but their original signals are transmitted intact to the subsequent stage, and since the high-speed data signal is not subjected at all to the photoelectric conversion, the high-speed property of light is fully utilized. In the packet structures shown in FIGS. 3C and 3D, the respective routing pulses may be multiplexed so that they appear in the same time slot.

Figure 12:
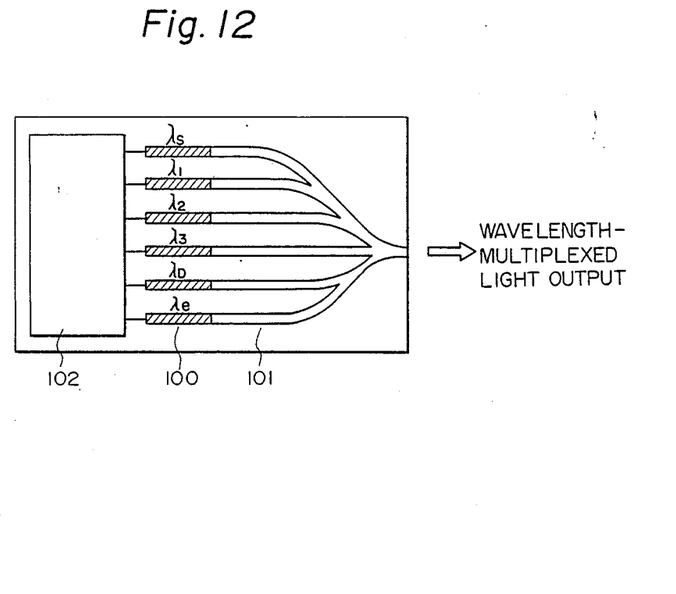
FIG. 12 is a schematic diagram of an integrated light source for use in the system of the present invention.

The light source for the optical packet switching system according to the present invention is implemented by an arrangement such, for example, as shown in FIG. 12, in which single-wavelength distributed feedback (DFB) semiconductor lasers 100, which operate at different wavelengths, are integrated in a monolithic form and their optical outputs are multiplexed via low-loss waveguides 101. Reference numeral 102 indicates an integrated circuit including a circuit for adjusting the timing for the power supply to each laser so that each packet structure shown in FIGS. 3A to 3D is obtained.

As described above, according to the present invention, the packet signal, which is transferred as an optical signal, can be switched intact without its conversion to an electrical signal; namely, the present invention does not involve the photoelectric conversion, and hence simplifies the arrangement of the switching system and permits high-speed packet switching which takes full advantage of the high-speed property of light.

As described above, the present invention implements a light triggering switch in which an optical control signal of a predetermined wavelength is taken out by an optical switch section which switches an optical path in accordance with the presence or absence of an optical signal of a predetermined wavelength and no opto-electro conversion is needed for a wide band optical signal of a wavelength different from that of the optical control signal. Furthermore, a high-speed packet switching network or wide-band integrated communication network can be constructed using a plurality of light triggering switches, each comprising, in combination, the optical switch section and an optical memory section which is controlled to pass therethrough or store therein the optical signal in accordance with the optical control signal; therefore, the present invention is of great utility in practical use.

What we claim is:

1. A light triggering switch which switches the optical path of an input optical signal to a desired output optical path, characterized by the provision of:
    a branching filter for branching a portion of an optical control signal of a predetermined wavelength; and
    an electrically-controlled optical switch which converts the optical control signal after being branched by the branching filter into an electrical signal and switches the optical signal to the desired output optical path in accordance with the intensity of the converted electrical signal.

2. A light triggering switch which switches the optical path of an input optical signal to a desired output optical path, characterized by the provision of:
    an optical memory section having a function of storing one of input optical signals which has no priority for the output optical path;
    a branching filter for branching a portion of an optical control signal of a predetermined wavelength; and
    an electrically-controlled optical switch which converts the optical control signal after being branched by the branching filter into an electrical signal and switches the optical signal toi the desired output optical path in accordance with the intensity of the converted electrical signal.

3. A light triggering switch which switches an optical path of an input optical signal including an optical control signal to a desired output optical path, characterized by the provision of:
    a branching filter for branching a portion of the optical control signal of a predetermined wavelength; and
    a nonlinear reflector type optical switch which switches the optical signal to the desired output optical path in accordance with the intensity of the optical control signal after being branched by the branching filter.

4. A light triggering switch which switches the optical path of an input optical signal to a desired output optical path, characterized by the provision of:
    an optical memory section having a function of storing one of input optical signals which has no priority for the output optical path;

a branching filter for branching a portion of an optical control signal of a predetermined wavelength; and a nonlinear reflector type optical switch which switches the optical signal to the desired output optical path in accordance with the intensity of the optical control signal after being branched by the branching filter.

* * * * *